(12) United States Patent
Schwartz et al.

(10) Patent No.: US 11,360,574 B2
(45) Date of Patent: Jun. 14, 2022

(54) STRETCHABLE INTERACTIVE TANGIBLES

(71) Applicant: LUXEMBOURG INSTITUTE OF SCIENCE AND TECHNOLOGY (LIST), Esch-sur-Alzette (LU)

(72) Inventors: Lou Schwartz, Luxembourg (LU); Valérie Maquil, Luxembourg (LU); Thibaud Latour, Arlon (BE); Annie Guerriero, Arlon (BE); Séverine Mignon, Thionville (FR)

(73) Assignee: Luxembourg Institute of Science and Technology (LIST), Esch-sur-Alzette (LU)

( * ) Notice: Subject to any disclaimer, the term of this patent is extended or adjusted under 35 U.S.C. 154(b) by 0 days.

(21) Appl. No.: 16/644,338

(22) PCT Filed: Aug. 29, 2018

(86) PCT No.: PCT/EP2018/073188
§ 371 (c)(1),
(2) Date: Mar. 4, 2020

(87) PCT Pub. No.: WO2019/048300
PCT Pub. Date: Mar. 14, 2019

(65) Prior Publication Data
US 2020/0201450 A1 Jun. 25, 2020

(30) Foreign Application Priority Data

Sep. 5, 2017 (LU) .................................. 100390

(51) Int. Cl.
*G06F 3/03* (2006.01)

(52) U.S. Cl.
CPC .................................. *G06F 3/0304* (2013.01)

(58) Field of Classification Search
CPC .............................. G06F 3/0304; G06F 3/0487
See application file for complete search history.

(56) References Cited

U.S. PATENT DOCUMENTS 6,175,954 B1    1/2001  Lester
9,158,389 B1 *  10/2015 Sharma ................. G06F 3/0304
(Continued)

FOREIGN PATENT DOCUMENTS

EP    0929027 A2    4/1999
EP    3109737 A2    10/2016

OTHER PUBLICATIONS

International Search Report for corresponding PCT/EP2018/073188 dated Oct. 31, 2018.

*Primary Examiner* — Hong Zhou
(74) *Attorney, Agent, or Firm* — Sandberg Phoenix & Von Gontard PG

(57) ABSTRACT

A system comprising an object; a computer device with a digital model containing a virtual object corresponding to the object; a position sensor for detecting the position of the object; and a communication means to transmit the position of the object to the computer device. The object is stretchable and the system is further provided with sensors for detecting the stretched condition of the object and with communication means to transmit said condition to the computer device. A system with actuators to modify the position and/or the stretched condition of the object and use of such systems for a collaborative complex problem-solving procedure in the context of urban planning.

4 Claims, 1 Drawing Sheet

(56) References Cited

U.S. PATENT DOCUMENTS

| | | | |
|---|---|---|---|
| 2002/0196250 A1* | 12/2002 | Anderson | A63H 33/042 345/420 |
| 2009/0158210 A1* | 6/2009 | Cheng | G06Q 30/0224 715/810 |
| 2010/0033427 A1* | 2/2010 | Marks | G06F 3/0346 345/156 |
| 2012/0280993 A1* | 11/2012 | Jakobsen | G06T 17/10 345/420 |
| 2013/0135081 A1* | 5/2013 | McCloskey | A63F 13/71 340/5.8 |
| 2014/0080605 A1* | 3/2014 | Peddi | A63F 13/00 463/32 |
| 2016/0067593 A1* | 3/2016 | Yim | A63F 13/23 463/31 |
| 2016/0332071 A1* | 11/2016 | Hirata | A63F 13/213 |
| 2017/0351094 A1* | 12/2017 | Poulos | G01B 11/022 |
| 2018/0071641 A1* | 3/2018 | Cortelyou | A63G 31/16 |

* cited by examiner

STRETCHABLE INTERACTIVE TANGIBLES

The present invention is the US national stage under 35 U.S.C. § 371 of International Application No. PCT/EP2018/073188, which was filed on Aug. 29, 2018, and which claims the priority of application LU 100390 filed on Sep. 5, 2017, the content of which (text, drawings and claims) are incorporated here by reference in its entirety.

FIELD

The invention is directed to the field of human-computer interfaces. The invention more particularly relates to the field of Tangible User Interfaces, TUI.

BACKGROUND

Human beings are used to manipulating physical objects. The field of Tangible User Interface, TUI, aims at materializing part of the human-computer interface and relies on the use of intuitive manipulation of physical objects.

Computer assisted design has been used for several decades in industrial design, architecture, urbanism, etc. For each software, several hours of training are often needed to master all the tools and functionalities.

The document EP 3 109 737 A2 discloses a system according to the preambles of claims 1 and 2. This system enables untrained people to plan the design of a kitchen. The user organizes physical objects and the computer builds the digital model of the kitchen accordingly. This system is however based on elementary or atomic solid blocks. This means that the flexibility of the system is limited. Indeed, the possible variations of design are limited to the available set of objects that can be arranged and positioned. Should a high level of flexibility be expected, a huge number of atomic blocks must be at the disposal of the user.

SUMMARY

The invention has for technical problem to provide an alternative tangible human-computer interface which enables an infinity of possible arrangement with a reduced number of atomic objects.

The invention is directed to a system comprising: at least one object; a computer device with a digital model containing a virtual object corresponding to the object; a position sensor for detecting the position of the object; a communication means to transmit the position of the object to the computer device; wherein the object is stretchable and the system is further provided with sensors for detecting the stretched condition of the object and with communication means to transmit the condition to the computer device.

The invention is also directed to a system comprising: at least one object; a computer device with a digital model containing a virtual object corresponding to the object; a position sensor for detecting the position of the object; a communication means to transmit the position of the object to the computer device; wherein the object is stretchable and the system further comprises: a position actuator for modifying the position of the object.

According to an exemplary embodiment, the system comprises further a stretching actuator to modify the stretched condition of the object.

According to an exemplary embodiment, the object is equipped with a display to indicate a piece of information in relation with the position or stretched condition of the object.

According to an exemplary embodiment, the system comprises a tangible table, a beamer and/or a monitor to indicate a piece of information in relation with the position or stretched condition of the object.

According to an exemplary embodiment, the displayed piece of information is based on predetermined criteria set in the digital model.

According to an exemplary embodiment, the system is programmed to synchronize the physical position and stretched condition of the object with the virtual position and virtual stretched condition of the virtual object, and vice versa: the system can synchronize the virtual position and stretched condition of the virtual object with the physical position and stretched condition of the real object.

According to an exemplary embodiment, the object is stretchable by means of inflatable features, telescopic features and/or foldable features, and the object is stretchable in one or more directions of space independently.

According to an exemplary embodiment, the position sensor and/or the stretched condition sensor consist(s) of or comprise(s) a camera, a Hall-effect sensor, an electromagnetic field sensor.

According to an exemplary embodiment, the stretching actuator and/or the position actuator is a pneumatic or electric actuator.

According to an exemplary embodiment, the stretched condition sensor and/or position sensor are integrated in the object.

According to an exemplary embodiment, the stretched condition sensor and/or position sensor are external to the object.

According to an exemplary embodiment, the object comprises a unique ID and the system comprises sensors to identify the ID of the object.

According to an exemplary embodiment, the position and or the stretched condition of the object can be changed in the three directions of space independently.

According to an exemplary embodiment, the digital model is programmed to record a series of successive positions and/or stretched conditions of the object.

The invention further relates to the use of a system according to any of the previously exposed embodiments, for exploring iteratively several positions and/or stretched positions of the object of the system. This way, the system can help a decision-making process for an individual or for a group.

In an exemplary embodiment, the use of the system is made for a collaborative complex problem-solving procedure, for instance in the context of urban planning, wherein the object is one of a road, a building, a crossroads or any other urban object. The system can be used in other fields, such as games or ludic activities, educational, training or knowledge transfer activities, exhibitions, scientific laboratory, photo or movie creation, artistic or creative activities, computer-aided manufacturing (for instance 3D printing) or building information modelling (BIM). The system may comprise also "passive" objects which positions and/or stretched conditions depend on the position and/or stretched condition of other objects. For instance, a walkway extending between two neighbouring buildings will take appropriate shape and position in response to the position and stretched condition of both buildings.

In an exemplary alternative or complementary embodiment, the system comprises: at least one stretchable object; a computer device with a digital model adapted to represent a virtual image of the object; wherein the object is equipped with a display to indicate a piece of information in relation with the stretched condition of the object.

In various instances, the piece of information results from an algorithm which is run in connection with the digital model and detects whether some pre-determined criteria are met.

In particular, if the size, shape, form or position of the object does not respect a pre-determined criterion, the display can show an appropriate message or colour. Alternatively or in combination with the display, an appropriate feedback in the vicinity or directly on the object could be given, like a coloured light projected in the environment or a sound.

In an exemplary alternative or complementary embodiment, the system comprises: at least one object; a computer device with a digital model containing a virtual object corresponding to the object; a position sensor for detecting the position of the object; a communication means to transmit the position of the object to the computer device; wherein the object is stretchable and the system is further provided with sensors for detecting the stretched condition of the object and with communication means to transmit the condition to the computer device; a position actuator for modifying the position of the object; and a stretching actuator to modify the stretched condition of the object, wherein the system can be switched between:

an INPUT mode, wherein the actuators are inactive and a user can modify the position and/or the stretched condition of the object;

and an OUTPUT mode, wherein the position and/or stretching actuator(s) modify the position and/or stretched condition of the object.

In an exemplary embodiment, the switch from INPUT mode to OUTPUT mode can be operated by the computer and the switch from OUTPUT mode to INPUT mode is made automatically upon detection of a change of position or stretched condition of the object made by the user.

In an exemplary embodiment, the system comprises a plurality of objects and the computer device is programmed such that for some objects the system is in INPUT mode while for some objects the system is in OUTPUT mode.

In an exemplary embodiment, the system is programmed such that the modification of a position and/or of a stretched condition of an object by the user generates a modification of the position and/or of the stretched condition of at least another object, to maintain the overall model of several objects at scale.

The invention is particularly interesting in that it can be used by anyone without training. It is furthermore particularly flexible and not limited to a finite number of configurations.

Definitions

The following paragraphs describe various embodiments of each element of the system according to the invention. Unless mentioned as alternatives, all these various embodiments of elements are combinable together to form various embodiments of the system of the invention.

The system of the invention comprises one or more objects. The term object is used to define a physical object which extends in the three dimensions of space. In various instances, the object consists of an intuitively or easily recognizable representation of an existing object, potentially at a larger or smaller scale. When more than one object is used in the system, it is appropriate to provide the objects with a unique ID, such as RFID, barcode, name, colour, etc.

In the system of the invention, the object is stretchable. This means that its overall dimension in one, two or three directions can be extended. The object is not merely two parts hinged together, but can be macroscopically deformed in at least one of its dimensions (width, length or height). The extension can be done at constant volume for the object or with a change of volume. The object can also comprise a rigid (non-stretchable) part and/or two or more independently stretchable parts. The rigid part of the object can correspond to a part for which no stretching can be allowed according to a pre-determined criterion or a criterion pre-set in the digital model.

The computer device of the system can be a personal computer, a smartphone, an application stored on a cloud, or any similar kind of computer device. The computer is provided with a digital model having a virtual object corresponding to the real physical object. The digital model can be as simple as a value stored in the memory of the computer device and representing a dimension or a position of the object. The digital model can be very complex, such as computer-aided design software with a graphically very similar representation of the real object.

The position or stretched condition sensors can be of various kinds. It can be a camera or a network of camera, RFID sensor, bar-code or QR-code reader or optical sensors a Hall-effect sensor, etc. The sensors can also have a function to detect the ID of the object. This is particularly important when a plurality of objects is used. To this end, the skilled person would know how to adapt various technologies to the needs of the invention, namely waves-like sonar, lidar, infrared, Bluetooth, altimeter and/or accelerometer.

The sensors communicate with the computer device. The communication can be achieved by wired or wireless protocols.

The position of the object can be a set of 6 values expressed as the 3 coordinates X, Y, Z of a pre-determined point of the object and the 3 coordinates of a vector representing the orientation of the object. For instance, the centre of gravity of the object can be the pre-determined point of the object and its coordinates in the three directions can define the localisation of the object in space with respect to an origin and reference axis x, y, z. The orientation of the object can be represented by a vector and can take any orientation in space with respect to the reference axis x, y, z or alternatively by the equation of a plane defined by or tangent to a surface of the object. The position can therefore be represented as a mathematical screw made of two vectors, one for the localisation and one for the orientation of the object.

The stretched condition can be expressed as a set of 3 values, representing a ratio of the size of the object in the 3 directions X, Y, Z with respect to the size of the object in a reference stretched condition. If the object comprises two or more parts that are independently stretchable, the stretched condition can be a matrix of two or more vectors.

The system can work in INPUT mode. In this mode, a user modifies the position and/or the stretched condition of the object. These modifications are detected and the computer device acts accordingly.

The system can also work in OUTPUT mode. In this mode, the user or a program modifies the virtual object on the computer device and actuators are provided in communication with the computer device, in order to modify physically the position and/or stretched condition of the object.

The system can also be provided with sensors and actuators such that it may work both in INPUT and OUTPUT mode. This way, it may be possible for the user to switch between the INPUT and the OUTPUT mode. Alternatively, the computer can automatically switch between one or the other mode. When more than one object is used, the system can simultaneously work in INPUT mode with respect to a first object, and in OUTPUT mode with respect to a second object. This means that the user can move and/or stretch the first object and the actuators driven by the computer can move and/or stretch the second object.

The stretching actuators can be of various kinds. For instance, they can be pneumatic, electric or hydraulic. They can be pistons or pumps.

The position actuators can also be of various kinds. For instance, an electromagnetically actuated table can interact with magnets in the object. The object can be a robot on wheels. The position can also be actuated by the combination of one or more telescopic arms and a spherical linkage to control the orientation and the displacement of the object.

Needless to say, that the person skilled in the art will depart from these examples without facing technical difficulties, and would consider any appropriate actuators among which non-mechanical (acoustic, electrostatic, magnetic) conveyors, manipulators mounted on wheels, etc. The actuators can be external to the object or can be part of the object. To this end, the object can comprise an energy source (battery, air pump, etc.).

The system can comprise a display. The display can be a monitor/screen or a light (LED). The display can be positioned on the object. Alternatively, a beamer can project an image on the object or in its vicinity. The colour of the object can therefore be changed. The beamer can be used in combination with the display on the object to broadcast complementary pieces of information.

In INPUT mode, for instance, the display can serve to indicate to the user whether the modification (in position or stretched condition) that he has made/he is making, infringes a pre-determined criterion, pre-set in the digital model. The display can also serve to mainly reflect the modification operated by the user.

For instance, if the object is representing a building and the digital model has been set to define a pre-determined ratio between the surface of the façade and the surface of the windows, the display or the object itself can represent such windows, or a maximal size of the windows. If the height of the building cannot extend above a legal limit in the neighbourhood, an appropriate message or icon can pop up on the display or the object can vibrate when the modification made by the user makes the building reach the maximal height. Other kinds of feedback are possible in complement or alternative to the display or the vibration, like a coloured light projected in the vicinity of the object or a sound or any other haptic feedback.

The skilled person would adapt the display and the corresponding message to his intended use of the system.

DRAWINGS

DETAILED DESCRIPTION

Figure 1:
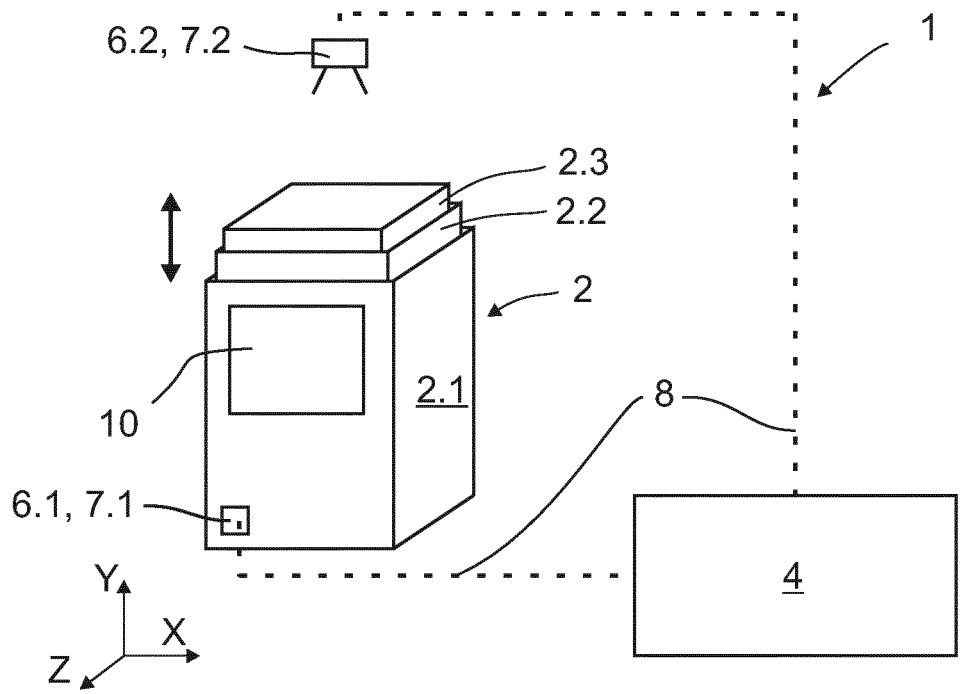
FIG. 1 shows a system according to an exemplary embodiment, in accordance with various embodiments of the invention.

FIG. 1 shows a system 1 according to an exemplary embodiment of the invention. The system 1 comprises an object 2 which is stretchable. In this particular example, the object comprises a plurality of interconnected telescopic parts 2.1, 2.2, 2.3 that can be slid with respect to each other to stretch the overall size of the object in the Y direction. The system 1 comprises also a computer device 4.

The system comprises a position sensor 6.1, 6.2 and a stretched condition sensor 7.1, 7.2. These sensors can be part of the object (sensors 6.1, 7.1) or external to the object (sensors 6.2, 7.2).

The sensors 6.1, 6.2, 7.1, 7.2 are connected to the computer device 4 through a transmission means 8. The transmission can be made by wire with appropriate protocol (RJ-45, USB, Coaxial . . . ) or can be wireless (Bluetooth, Wi-Fi, Z waves, . . . ).

The object comprises furthermore a display 10 which shows a piece of information in relation with the position or stretched condition of the object. For instance, if the object is used to represent a building, the display can indicate the number of floors of the building in function of the stretched condition. Should the user extend the object further, the number displayed will increase.

Figure 2:
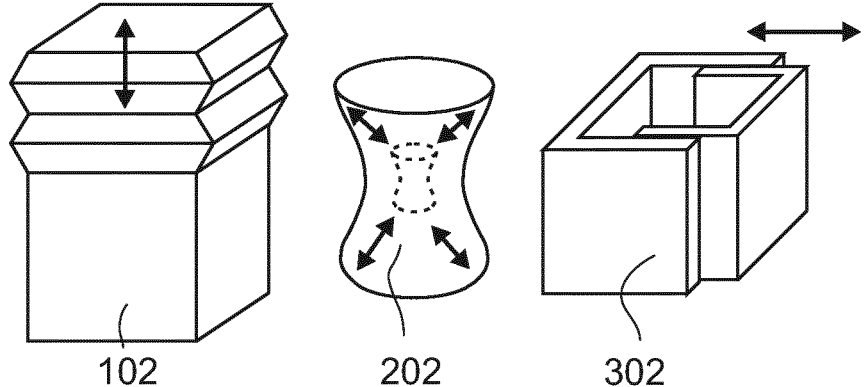
FIG. 2 shows various exemplary embodiments of the object, in accordance with various embodiments of the invention.

FIG. 2 exemplarily represents three alternatives 102, 202, 302 of the object. The object 102 is stretchable by means of foldable panels. The object 202 is stretchable by means of his plasticity. The object 302 is stretchable by means of telescopic interconnected parts. All these features which make the object stretchable can be combined to stretch the object in more than one direction, or to stretch only part of the object.

The objects can be stretched directly by the user (INPUT mode) or can be stretched by an actuator (OUTPUT mode). In INPUT mode, the objects are sufficiently elastic to be stretched by hand and sufficiently rigid to hold their form. Alternatively, stopper element (ratchet, pin, etc. . . . ) can be provided to hold the stretched configuration of the object once the user releases his hand from the object.

In OUTPUT mode, pneumatic, hydraulic or electric pistons can be used for effecting a translation of parts of the objects 102 and 302. For the object 202, a pump can compress or inject a fluid into the object such that the object expands in all directions. Alternatively, if some parts of the objects are purposely foreseen to be rigid, the expansion can be made in one or two of the direction of space only.

Figure 3:
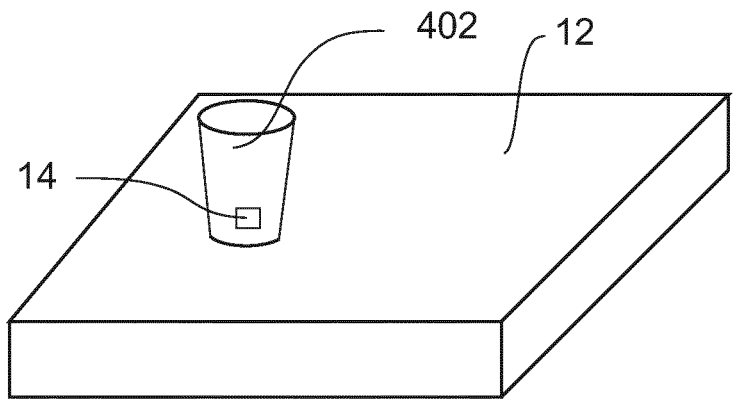
FIG. 3 shows an exemplary system according to another exemplary embodiment, in accordance with various embodiments of the invention.

FIG. 3 exemplarily shows an example of a position actuator 12. The position actuator can be a table with electromagnets. In this example, the object 402 contains magnets 14 which are attracted by specific zones of the table. The object will therefore be moved to the appropriate location and orientation. Other embodiments for the position actuator are possible, such as vibrating table, conveyor belt, robot gripper, etc.

The invention claimed is:
1. A system comprising:
   a plurality of objects, each of which representing a road, a building or a crossroad, each of the objects being movable into a respective position and being stretchable into a respective stretched condition;
   a computer device with a digital model containing virtual objects respectively corresponding to the objects;
   a position sensor for detecting the position of the objects;
   a communication means to transmit the position of the objects to the computer device;

at least one sensor for detecting the stretched condition of the objects;

a communication means to transmit the stretched condition to the computer device, wherein the system is used for exploring iteratively at least one of several positions and stretched conditions of the objects in a collaborative complex-problem-solving procedure, in the context of urban planning, wherein at least one first object of the plurality of objects is movable and stretchable by hand by a user, and a position and stretched condition of a first virtual object corresponding to the first object is updated in the digital model in accordance with the position and stretched condition of the first object; and wherein at least one second object of the plurality of objects is movable by a position actuator and is stretchable by a stretching actuator, the position actuator and the stretching actuator being controlled by the computer device.

2. The system according to claim 1, wherein each object of the plurality of objects comprises a unique ID and the system further comprises sensors to identify the ID of the objects.

3. The system according to claim 1, wherein the digital model is programmed to record at least one of a series of successive positions and stretched conditions of the objects.

4. The system according to claim 1, wherein the system comprises a tangible table indicating a piece of information relative to the position or stretched condition of at least one of the objects.

* * * * *